United States Patent
Wu (10) Patent No.: US 9,075,537 B2
(45) Date of Patent: Jul. 7, 2015

(54) COMMUNICATION METHOD APPLIED TO TRANSMISSION PORT BETWEEN ACCESS DEVICE AND CONTROL DEVICE FOR PERFORMING MULTIPLE OPERATIONAL COMMAND FUNCTIONS AND RELATED ACCESS DEVICE THEREOF

(71) Applicant: PixArt Imaging Inc., Hsin-Chu (TW)

(72) Inventor: Chih-Yen Wu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 155 days.

(21) Appl. No.: 13/902,967

(22) Filed: May 27, 2013

(65) Prior Publication Data

US 2014/0095735 A1    Apr. 3, 2014

(30) Foreign Application Priority Data

Oct. 3, 2012 (TW) .............................. 101136516 A (51) Int. Cl.
- *G06F 13/00* (2006.01)
- *G06F 3/06* (2006.01)
- *G06F 13/38* (2006.01)
- *G06F 3/00* (2006.01)

(52) U.S. Cl.
CPC .............. *G06F 3/0659* (2013.01); *G06F 3/061* (2013.01); *G06F 3/0673* (2013.01); *G06F 13/385* (2013.01); *G06F 2213/3854* (2013.01)

(58) Field of Classification Search
CPC ........ G06F 13/00; G06F 3/00; G06F 2003/00
USPC .......................................... 710/305, 100, 33
See application file for complete search history.

(56) References Cited

U.S. PATENT DOCUMENTS

| | | | |
|---|---|---|---|
| 5,539,389 A * | 7/1996 | Bystrak et al. | 340/9.11 |
| 7,234,031 B2 * | 6/2007 | Yim et al. | 711/154 |
| 7,354,397 B2 * | 4/2008 | Fujita et al. | 600/109 |
| 7,596,699 B2 * | 9/2009 | Kwok | 713/176 |
| 8,224,249 B2 * | 7/2012 | Ge | 455/41.2 |
| 8,732,526 B1 * | 5/2014 | Marroquin et al. | 714/27 |
| 2002/0082847 A1 * | 6/2002 | Vandewalle et al. | 705/1 |
| 2003/0076734 A1 * | 4/2003 | Ryan et al. | 365/233 |
| 2005/0144372 A1 * | 6/2005 | Walker | 711/105 |
| 2008/0209250 A1 * | 8/2008 | Fong | 713/500 |
| 2010/0131610 A1 * | 5/2010 | Furtner et al. | 709/208 |
| 2010/0174854 A1 * | 7/2010 | Kim | 711/103 |
| 2011/0069970 A1 * | 3/2011 | Fein et al. | 398/141 |
| 2011/0137460 A1 * | 6/2011 | Lee et al. | 700/250 |
| 2011/0237199 A1 * | 9/2011 | Venkataraman et al. | 455/67.11 |
| 2013/0159939 A1 * | 6/2013 | Krishnamurthi | 715/863 |
| 2013/0246836 A1 * | 9/2013 | Lin | 713/600 |
| 2014/0069120 A1 * | 3/2014 | Takemoto et al. | 62/56 |

* cited by examiner

*Primary Examiner* — Christopher Shin
(74) *Attorney, Agent, or Firm* — Winston Hsu; Scott Margo (57) ABSTRACT

A communication method applied to a transmission port between an access device and a control device includes: encoding a specific command to generate mode data; generating output data according to content of the mode data and content of command data corresponding to the specific command; and transmitting the output data from one of the access device and control device to the other via the transmission port. The other device of the access device and control device is used for receiving the output data and decoding the mode data of the output data to generate a decoding result, and selecting the specific command from a plurality of operational commands for executing a communication function corresponding to the specific command according to the decoding result.

11 Claims, 5 Drawing Sheets

FIG. 1

| Mode data | Command |
|---|---|
| 000 | Single write register |
| 001 | Single read register |
| 010 | Burst read motion data |
| 011 | Multi-write register |
| 100 | Multi-read register |
| 101 | Status report |
| 110 | Image read-out |
| 111 | Status reset |

COMMUNICATION METHOD APPLIED TO TRANSMISSION PORT BETWEEN ACCESS DEVICE AND CONTROL DEVICE FOR PERFORMING MULTIPLE OPERATIONAL COMMAND FUNCTIONS AND RELATED ACCESS DEVICE THEREOF

BACKGROUND OF THE INVENTION

1. Field of the Invention

The disclosed embodiments of the present invention relate to a signal transmission mechanism of a communication interface, and more particularly, to a communication method applied to a transmission port between an access device and a control device for performing a plurality of operational command functions and related access device thereof.

2. Description of the Prior Art

Conventionally, the communication interface between a control device and an access device (e.g., an I/O device) usually has a plurality of transmission ports, and signals of the transmission ports represent different operational commands respectively. For instance, a data write command and a data read command transmitted from a conventional communication interface to an access device are achieved via two different transmission ports. Therefore, when there are more types of operational commands performed between a control device and an access device, the number of transmission ports at the communication interface should also increase for performing different operational commands respectively. However, using more transmission ports means that the pin count or port number of the access device will also increase. For nowadays integrated circuit (IC) chips, more transmission ports or more pins will increase the production cost. Hence, the conventional communication interface is not a cost-efficient design for today's integrated circuit implementation.

SUMMARY OF THE INVENTION

Thus, one of the objectives of the present invention is to provide a communication method used for a transmission port between an access device and a control device and a related access device thereof. The communication method can perform a plurality of operational command functions on the transmission port, thus reducing the number of transmission ports needed. In practice, it is even possible to utilize only one transmission port to perform a plurality of operational command functions, thereby effectively solving the problems encountered by the conventional designs.

According to a first embodiment of the present invention, a communication method applied to a transmission port between an access device and a control device is disclosed. The communication method includes: encoding a specific command to generate a mode data; generating an output data according to content of the mode data and content of a command data corresponding to the specific command; and transmitting the output data from one of the access device and the control device to the other via the transmission port; wherein the other device of the access device and the control device is utilized to receive the output data, and decode the mode data of the output data to generate a decoding result, and select the specific command from a plurality of operational commands for executing a communication function corresponding to the specific command according to the decoding result.

According to a second embodiment of the present invention, a communication method applied to a transmission port between an access device and a control device is disclosed. The communication method includes: receiving an output data transmitted from one of the access device and the control device to the other via the transmission port; decoding the output data to generate a decoding result; and selecting a specific command from a plurality of different operational command for performing a communication function corresponding to the specific command according to the decoding result; wherein the output data is generated according to content of a command data and content of a mode data corresponding to the specific command, and the mode data is generated through encoding the specific command.

According to a third embodiment of the present invention, an access device coupled to a control device via a transmission port is disclosed. The access device includes a processing circuit and a communication circuit. The processing circuit is arranged for encoding a specific command to generate a mode data, and generating an output data according to content of the mode data and content of a command data corresponding to the specific command. The communication circuit is coupled to the processing circuit, and is arranged for transmitting the output data from the access device to the control device via the transmission port. Wherein the mode data of the output data is received and decoded by the control device to generate a decoding result; and the control device is utilized to select the specific command from a plurality of operational commands for executing a communication function corresponding to the specific command according to the decoding result.

According to a fourth embodiment of the present invention, an access device coupled to a control device via a transmission port is disclosed. The access device includes a processing circuit and a communication circuit. The processing circuit, arranged for controlling a communication circuit. The communication circuit is coupled to the processing circuit, and is arranged for receiving an output data transmitted from one of the access device and the control device to the other via the transmission port, wherein the output data is generated by the control device according to content of a command data and a mode data corresponding to a specific command, and the mode data is generated through encoding the specific command. Wherein the processing circuit is utilized for decoding the output data to generate a decoding result, and selecting a specific command from a plurality of different operational command for performing a communication function corresponding to the specific command according to the decoding result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
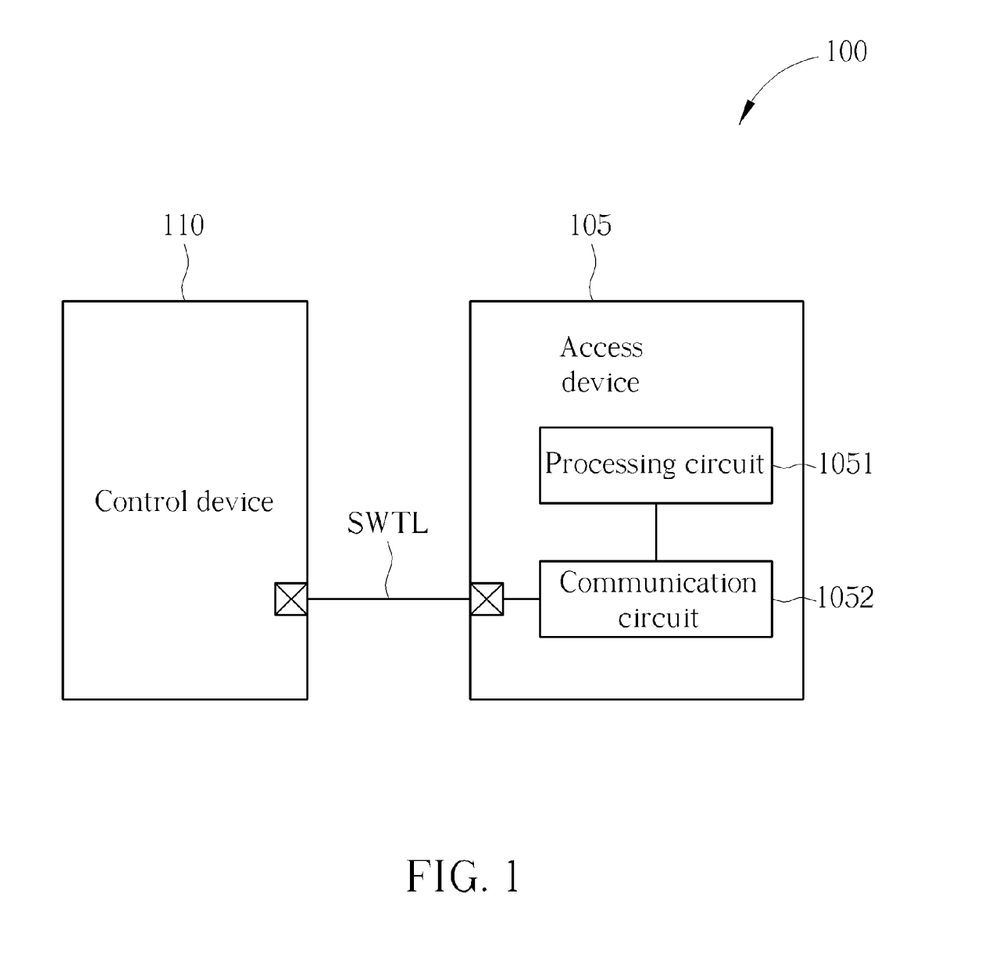
FIG. 1 is diagram illustrating a communication method performed between an access device (e.g., an I/O device) and a control device according an embodiment of the present invention.

Please refer to FIG. 1, which is diagram illustrating a communication method performed between an access device (e.g., an I/O device) 105 and a control device 110 according an embodiment of the present invention. As shown in FIG. 1, the signal communication system 100 includes an access device 105 and a control device 110, wherein the access device 105 includes a processing circuit 1051 and a communication circuit 1052. The access device 105 is electrically coupled to the control device 110 through a single transmission port, and the communication circuit 1052 is used for communicating with the control device 110 through the single transmission port. The processing circuit 1051 is coupled to the communication circuit 1052 in order to control the communication circuit 1052 and generate data or signals related to the communication with the control device 110. In this embodiment, the access device 105 is an optical pointing device such as an optical mouse. Therefore, the access device 105 generates sensing data related to the optical sensing or generates motion data. Besides, the access device 105 itself may also have one or more built-in registers (not shown in FIG. 1) used to temporarily store read/write data. By way of example, but not limitation, the control device 110 may be a micro control unit (MCU). Thus, the control device 110 will communicate with the access device 105, in order to obtain motion data or access read/write data which is temporarily stored in registers; in other words, the control device 110 is able to refer to different operational commands for transmitting command data (e.g., address or other information) corresponding to the different operational commands to the access device 105 for performing functions such as obtaining the motion data or the image sensing data, and reading data from or writing data into registers. In addition, other communication control functions other than data access (or data read/write) functions may be performed between the access device 105 and the control device 110. For example, the access device 105 may take the initiative to request the control device 110 to perform a status report operation, and the access device 105 may transmit the command data/signal corresponding to the status-report command to the control device 110 for informing the control device 110 whether the current status of the access device 105 changes. In addition, regarding other communication control functions different from data access (or data read/write) functions, the control device 110 may also take the initiative to request the access device 105 to perform a status reset operation, and transmit the command data/signal corresponding to the status reset command to the access device 105 for resetting the current status of the access device 105.

In order to implement functions of a variety of different operational commands on a single transmission port, the communication between the control device 110 and the access device in the present embodiment utilizes encoding/decoding methodologies for communicating with each other to indicate the operational command currently performed, wherein one of the control device 110 and the access device 105 encodes and generates a mode data according to the desired operational command, and the mode data may be representative of a corresponding communication function of the operational command. The related command information content of the operational command and the mode data are transmitted to the other one of the control device 110 and the access device 105 such that the other one of the control device 110 and the access device 105 can decode the received mode data to know the operational command which is desired to be executed, and execute the operational command in accordance with the decoded result and the related command information content of the received operational command. Therefore, the objective of running multiple operational commands on a single transmission port while reducing the pin count is achieved.

The different operational commands/functions mentioned above correspond to different communication function modes related to encoding/decoding operations respectively. In a preferred embodiment of the present invention, the communication interface between the access device 105 and the control device 110 is able to execute a plurality of different operational commands. That is to say, a plurality of different types of communication function modes, such as communication function modes correspond to eight different operational commands, can be achieved, where the operational commands can be divided into data access commands and non-data access commands. In other words, the communication function modes contain the data access mode and the non-data access mode correspondingly. The data access commands include a single read command, a single write command, a multi-read command, a multi-write command, a burst read motion data command, and an image read-out command; and the non-data access commands include a state-report command and a status-reset command. Similarly, the data access mode as well as the non-data access mode also include a plurality of corresponding communication functions modes; however, the details are omitted here for brevity. In addition, the single read command, the single write command, the multi-read command, and the multi-write command are executed to access one or more registers in the access device 105, respectively. Hence, these operational commands can also be regarded as register data access commands.

When executing the single read command, the single write command, the multi-read command or the multi-write command, the control device 110 not only encodes and generates the corresponding mode data to the access device 105, but also transmits the related command data to the access device 105 to access (read or write) data segments of the registers in the access device 105. In addition, when executing the burst read motion data command or the image read-out command, the control device 110 not only encodes and generates the corresponding mode data to the access device 105, but also transmits different motion command data and image command data to the access device 105 to read out the motion data or the sensed image data in the access device 105. When executing the status-report command, the access device 105 not only encodes and generates the corresponding mode data to the access device 105, but also transmits a status data corresponding to the status-report command to the control device 110 to notify the control device 110 that the current status changes. When executing the status-reset command, besides encoding, generating and transmitting the corresponding mode data to the access device 105, the control device 110 further transmits a status data corresponding to the status-reset command to the access device 105 to reset the status of the access device 105.

Accordingly, the communication interface of the single transmission port has two-way communication transmission according to the embodiment of the present invention. For the control device 110 initiating the execution of the operational commands, it encodes the specific command first. In practice, the encoding process is implemented via a corresponding look-up table (which may be stored in the control device 110 and record mapping relationship between a plurality of commands and mode data) to encode the specific command to generate a mode data, where the mode data can indicate the type of the corresponding specific command. Then, an output data will be generated in accordance with the content of the encoded data and the content of the related command data of the specific command, and the output data will be transmitted from the control device 110 to the access device 105 located at the other end via the transmission port. For example, the specific command is the aforementioned multi-write command, and the control device 110 performs an encoding process upon the multi-write command to generate the mode data. Next, the control device 110 assembles the mode data and the command data content of the multi-write command (such as a write address and the content of write data) to obtain the output data, and transmits the output data to the access device 105 through the transmission port. Hence, the communication circuit 1052 of the access device 105 will receive the output data (including the content of the mode data and the content of the command data of the multi data write command) transmitted from the transmission port. Once the content of the mode data, the write address, and the write data are received, the processing circuit 1051 of the access device 105 can decode the mode data to obtain a decoding result, and meanwhile know the desired command requested by the control device 110. Then, the processing circuit 1051 will determine/select a specific command from a plurality of commands to perform the corresponding operation.

Furthermore, for the access device 105 initiating the communication with the control device 110, it encodes a specific command first. In practice, the encoding process is implemented by the processing circuit 1051 using a corresponding look-up table (which may be stored in the access device 105, and record mapping relationship between a plurality of commands and mode data) to encode the specific command to generate a mode data, where there is one-to-one mapping between the content of the mode data and the specific command; moreover, the access device 105 generates an output data in accordance with the content of the encoded data and the content of the related command data of the specific command. In practice, the output data includes the mode data and the related data of the specific command. Next, the communication circuit 1052 transmits the output data to the control device 110 via the single transmission port. For example, the specific command is a status-report command of the access device 105, and is arranged for reporting that the status of the access device 105 is changed/switched from a sleeping state to a normal state; besides, the processing circuit 1051 generates the encoded data in accordance with the specific command, and generates the output data according to the content of the encoded data and the content of the data of the status-report command, and then the output data will be transmitted from the communication circuit 1052 to the control device via the transmission port. After receiving the output data, the control device 110 can obtain the content of the mode data and the status-report command, but does not know the command executed by the access device 105 is the status-report command. At this moment, the control device 110 decodes the mode data of the output data by referring the corresponding look-up table and accordingly generates a decoding result. Next, the control device 110 refers to the decoding result to know the operational command indicated by the received output data, and therefore executes the corresponding operational command. For instance, the control device 110 knows the requested command is a status-report command when the decoding result is generated.

Figure 2A:
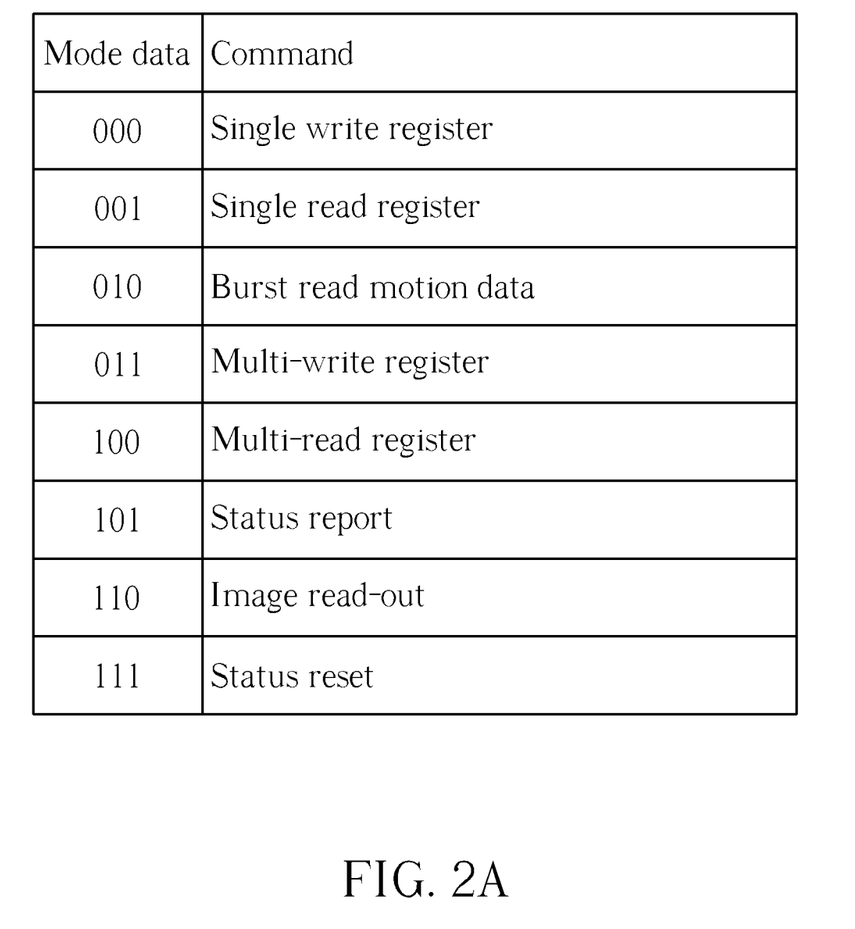
FIG. 2A is a diagram illustrating the mode corresponding look-up table utilized to generate the mode data during the encoding/decoding operation according to a preferred embodiment of the present invention.
Figure 2B:
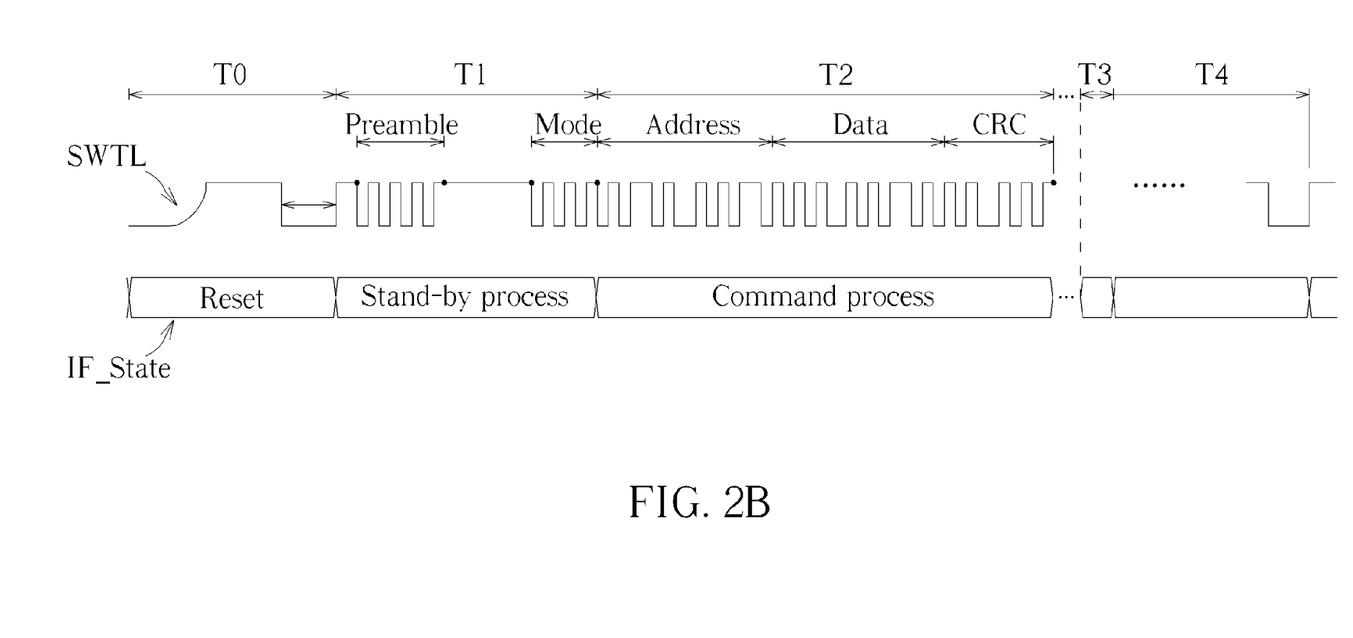
FIG. 2B is a timing diagram illustrating signals at the communication interface between the access device and the control device shown in FIG. 1.

It should be noted that, in the preferred embodiment of the present invention, the communication interface between the access device 105 and the control device 110 is able to perform eight different operational commands. Therefore, the mode data generated through the one-to-one encoding/decoding operation should be implemented using three data bits. However, the practical implementation mentioned above is only one of examples of the present invention; in practice, the number of data bits of the mode data and the types of the operational command are not limitations of the present invention. Please refer to FIG. 2A in conjunction with FIG. 2B. FIG. 2A is a diagram illustrating the mode corresponding look-up table utilized to generate the mode data during the encoding/decoding operation according to a preferred embodiment of the present invention. FIG. 2B is a timing diagram illustrating signals at the communication interface between the access device 105 and the control device 110 shown in FIG. 1. As shown in FIG. 2A, there is a one-to-one mapping between the mode data and the operational command, and the mode data is implemented using 3 data bits; hence, according to the corresponding look-up table shown in FIG. 2A, a specific operational command can be encoded to generate a mode data through an encoding operation, and the decoding operation correspondingly identifies the specific command from a plurality of operational commands through a decoding process based on the corresponding look-up table.

As shown in FIG. 2B, there is an illustration of the signals of the communication interface mentioned above. In this embodiment, the signals of communication interface indicate that, after the access device 105 is booted, the control device 110 would first access the access device 105, and then the access device 105 will perform the status report operation; however, this is only for convenience of describing that the two-way communication transmission can be achieved via a single transmission port according to the present embodiment, and is not meant to be a limitation of the present invention. As shown in FIG. 2B, SWTL represents an example of signals of the single transmission port at different time points, while IF_State represents the process contents between the access device 105 and the control device 110 at different time intervals. Since it is associated with the operation of the access device 105 or the control apparatus 110, it may also be regarded as a diagram of the operation of the access device 105 per se. First, at the time interval T0, the access device 105 boots and performs status reset simultaneously. At this moment, the existence of the access device 105 is detected, and any operational command therefore can be performed upon the access device 105. At the time interval T1, the access device 105 enters a stand-by process, and the communication circuit 1052 of the access device 105 will receive a preamble and the mode data transmitted from the control device 110. As described above, the mode data is encoded by the control device 110. Hence, the access device 105 will know the received operational command once the mode data is decoded by the processing circuit 1051 successfully. In addition, the preamble is generated by the control device 110 for clock recovery. To put it another way, the preamble is utilized to obtain a more accurate clock for the access device 105. After the preamble and the mode data are completely transferred, the communication interface between the control device 110 and the access device 105 will enter a command process at the time interval T2. At this moment, the control device 110 will transmit a related command data of an operational command corresponding to the mode data to the access device 105 for allowing the access device 105 to perform the operational command in accordance with the content of the related command data once the operational command is identified by the processing circuit 1051 of the access device 105. For example, if the control device 110 performs the single write command, the content of the encoded mode data would be '000'. Therefore, in accordance with the mode look-up table as shown in FIG. 2A, the access device 105 at the decoding side will know the current operation should be the single write command. In the command process mentioned above, the related command data may be, for example, write address (e.g., which register to write) of the single write command and the content needed to be written. Therefore, when the access device 105 receives the mode data '000' and the command data mentioned above, the desired single write command requested by the control device 110 will be performed correctly by the access device 105. Further, when the communication interface enters the command process, the control device 110 in this embodiment further transmits an error checking code to the access device 105 after transmitting the related command data. The error checking code allows the access device 105 to examine if there is any error bits induced during data transmission. In practice, a cyclic redundancy check code (CRC code) is employed to achieve the error checking function in this embodiment; however, this is only a preferred embodiment, but not a limitation of the present invention.

Figure 3:
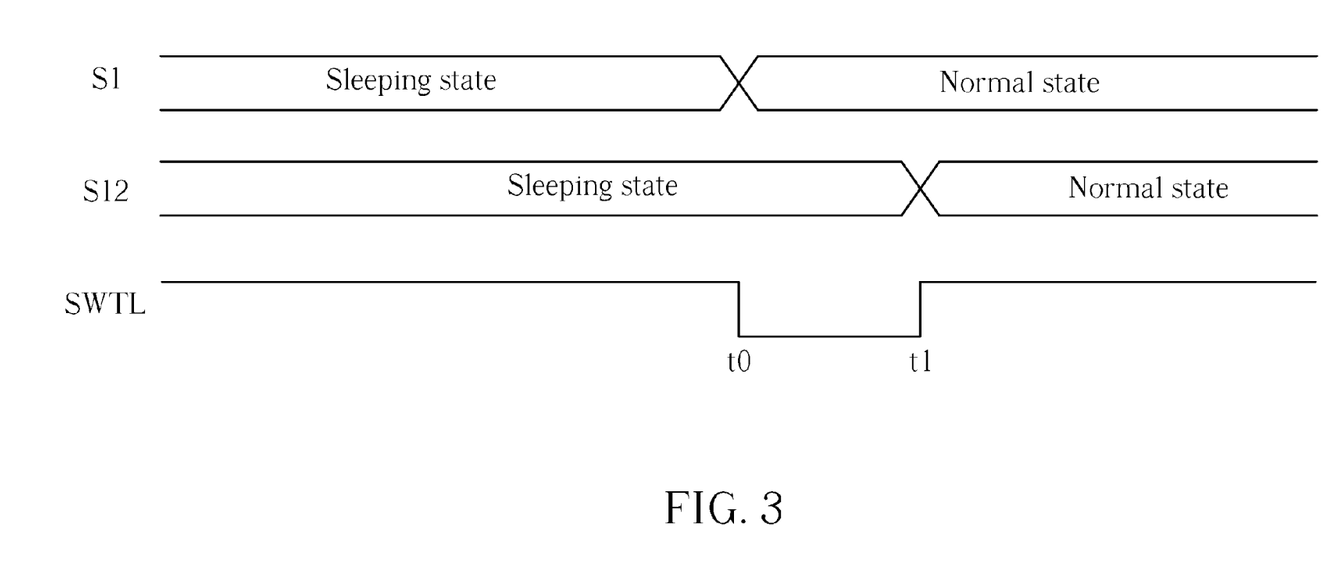
FIG. 3 is a diagram illustrating the signal waveform of the transmission port of the communication interface when the access device performs a status-report command according to a preferred embodiment of the present invention.

Furthermore, in addition to the data access commands mentioned above, the transmission port may also have a status-report command issued from the access device 105 to the control device 110. For example, as shown in FIG. 2B, after the control device 110 finishes the single write command in this embodiment, if there is no command executed between the control device 110 and the access device 105 for a period of time, the access device 105 will enter a sleeping state from the normal state for saving power consumption; and the control device 110 may also be switched to the sleeping state in order to save power. By way of example, but not limitation, the access device 105 may be a portable device. Then the access device 105 is configured to wake up for a specific period of time periodically to check if it is need to switch to the normal state from the sleeping state. If the access device 105 decides to switch to the normal state, the access device 105 will notify the control device 110 to switch to the normal state for performing communication between them. In practice, the mode data generated by the processing circuit 1051 is '101'. In other words, during another stand-by process (i.e., time interval T3) between the communication interface, the communication circuit 1052 would transmit the preamble and the mode data '101' mentioned above to the control device 110 for clock recovery. Thus, after decoding the mode data '101', the control device 110 can know that the access device 105 is performing the status-report command, and the communication interface between them will enter the command process (i.e., time interval T4). During the status-report command process, the processing circuit 1051 will control the communication circuit 1052 to pull the signal level on the transmission port to a low level (please note that the signal level is pulled high when the access device 105 is in the sleeping state) to inform the control device 110 of the timing of the status switching. Please refer to FIG. 3, which is a diagram illustrating the signal waveform of the transmission port of the communication interface when the access device 105 performs a status-report command according to a preferred embodiment of the present invention. As shown in FIG. 3, the communication interface is operating under the command process (e.g., the time interval T4 shown in FIG. 2B); wherein S1 represents the status of the access device 105, S2 represents that status of the control device 110, and SWTL represents the signal waveform of the transmission port of the communication interface. As shown in FIG. 3, before time t0, the access device 105 and the control device 110 are both in the sleeping state, and the signal level of SWTL is high at this moment to prevent the noise interference from affecting the signal transmission. During the command process (i.e., time interval T4), the access device 105 will pull the signal level of SWTL to a low level at time t0, and the control device 110 will detect that the signal level of SWTL has a transition from a high level to a low level and know that the access device 105 changes its status from the sleeping state to the normal state. Therefore, the control device 110 will also change its status from the sleeping state to the normal state. At time t1, the control device 110 will pull the signal level of SWTL to a high level so as to indicate that the reported information form the access device 105 is acknowledged. It should be noted that the process of using the access device 105 to report its current status to the control device 110 for making the status of the control device 110 changed belongs to a software interrupt process or function, and the purpose thereof is to wake up the control device 110.

Figure 4:
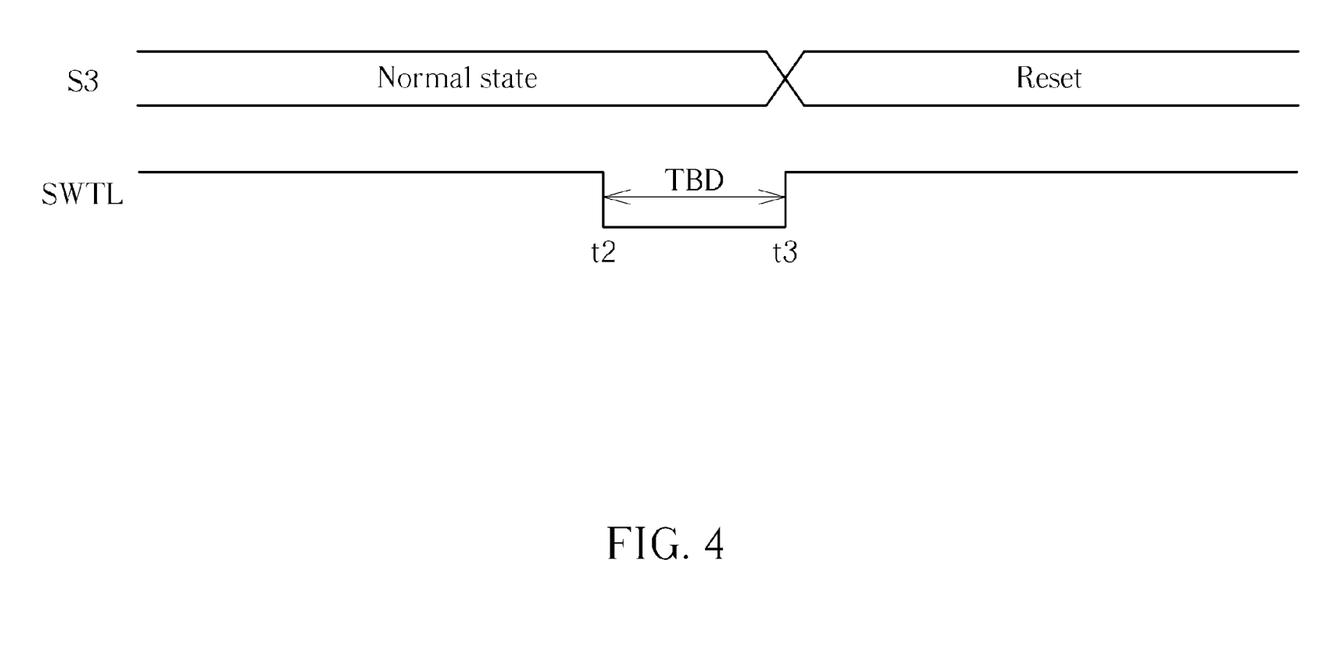
FIG. 4 is a diagram illustrating the signal waveform of the transmission port of the communication interface when the access device performs a status-reset command according to a preferred embodiment of the present invention.

Further, when the control device 110 executes the status-reset command, the control device 110 will generate the encoded mode data '111', and then transmit the preamble and the mode data '111' mentioned above to the access device 105 under the stand-by process, where the transmitted preamble and mode data '111' will be received by the communication circuit 1052. Therefore, the processing circuit 1051 is able to know that the control device 110 is executing the status-reset command currently after decoding the mode data '111'. During the command process of the communication interface, the control device 110 pulls the signal level of the transmission port of the communication interface to a low level, and allows the signal level to maintain at the low level for a time interval TBD (as shown in FIG. 4) to indicate the access device 105 the appropriate timing to reset its status. Thus, when the processing circuit 1051 of the access device 105 finds that the signal level of the transmission port maintains at the low level for the time interval TBD, the access device 105 resets its status correspondingly. As shown in FIG. 4, the control device 110 pulls the signal level of SWTL to the low level from time t2 to time t3, wherein S3 represents that the access device 105 starts to reset its status from the original normal state after time t3.

Furthermore, as described above, the embodiments of the present invention illustrate the operation of a plurality of operational commands performed through a single transmission port; however, it should be noted that the operational commands are not limited to these exemplary operational commands shown in FIG. 2A. In one embodiment, the communication interface between the access device 105 and the control device 110 may also be configured to perform two different commands. For instance, one of the two different operational commands is the data access command (e.g., the data write command or the data read command), and the other is the non-data access command (e.g., the status-report command or the status-reset command). In addition, in another embodiment, one of the two different operational commands may also be the data write command, while the other is the data read command. In addition, the different operational commands may also include a first data access command and a second data access command which is different from the first data access command, and the first data access command and the second data access command may be any two of the register data access command, the burst read motion data command, and the image read-out command, respectively. These alternative designs all obey the spirit of the present invention, and belong to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method applied to a transmission port between an access device and a control device, comprising:
   selecting one as a specific command according to a plurality of types of commands of the access device, the commands including a single write register command, a single read register command, a burst read motion data command, a multi-write register command, a multi-read register command, a status report command, an image read-out command, and a status reset command;
   using one of the access device and control device to encode the specific command to generate a mode data;
   using the one of the access device and control device to generate an output data according to content of the mode data and content of a command data corresponding to the specific command; and
   transmitting the output data from the one of the access device and control device to another one of the access device and control device via the transmission port;
   wherein the another one of the access device and control device is utilized to receive the output data, decode the mode data of the output data to generate a decoding result, and select the specific command from a plurality of different operational commands according to the decoding result for executing a communication function corresponding to the specific command.

2. The communication method of claim 1, wherein the step of generating the mode data comprises:
   encoding the specific command to generate the mode data according to mapping relationship between a plurality of commands and mode data stored in a look-up table; and
   the step of generating the output data comprises:
   generating a preamble; and
   generating the output data according to the preamble, the content of the mode data, and the content of the command data corresponding to the specific command.

3. The communication method of claim 2, wherein the preamble is utilized for clock recovery.

4. The communication method of claim 1, wherein the plurality of different operational commands correspond to a plurality of different mode data, respectively, and comprise a data access command and a non-data access command.

5. A communication method applied to a transmission port between an access device and a control device, comprising:
   receiving an output data transmitted from one of the access device and the control device to the other of the access device and the control device via the transmission port;
   decoding the output data to generate a decoding result; and
   selecting a specific command from a plurality of different operational commands according to the decoding result, and performing a communication function corresponding to the specific command;
   wherein the output data is generated according to content of a command data and content of a mode data corresponding to the specific command, and the mode data is generated through encoding the specific command; and, the plurality of different operational commands include a single write register command, a single read register command, a burst read motion data command, a multi-write register command, a multi-read register command, a status report command, an image read-out command, and a status reset command.

6. The communication method of claim 5, wherein the step of receiving the output data comprises:
   receiving a preamble, the mode data, and the content of the command data corresponding to the specific command included in the output data; and
   the step of generating the decoding result comprises:
   decoding the mode data of the output data to generate the decoding result according to mapping relationship between a plurality of commands and mode data that is stored in a look-up table;
   wherein the preamble is utilized for clock recovery.

7. An access device, coupled to a control device via a transmission port, comprising:
   a processing circuit, arranged for selecting one as a specific command according to a plurality of types of commands of the access device, encoding the specific command to generate a mode data, and generating an output data according to content of the mode data and content of a command data corresponding to the specific command, the commands including a single write register command, a single read register command, a burst read motion data command, a multi-write register command, a multi-read register command, a status report command, an image read-out command, and a status reset command; and
   a communication circuit, coupled to the processing circuit, arranged for transmitting the output data from the access device to the control device via the transmission port;
   wherein the mode data of the output data is received and decoded by the control device to generate a decoding result, and the control device is arranged to select the specific command from a plurality of different operational commands according to the decoding result for executing a communication function corresponding to the specific command.

8. The access device of claim 7, wherein the processing circuit encodes the specific command to generate the mode data according to mapping relationship between a plurality of commands and mode data that is stored in a look-up table, generates a preamble, and generates the output data according to the preamble, the content of the mode data, and the content of the command data corresponding to the specific command.

9. The access device of claim 8, wherein the preamble is utilized for clock recovery.

10. An access device, coupled to a control device via a transmission port, comprising:
    a processing circuit, arranged for controlling a communication circuit; and the communication circuit, coupled to the processing circuit, arranged for receiving an output data transmitted from one of the access device and the control device to the other of the access device and the control device via the transmission port, wherein the output data is generated by the control device according to content of a command data and a mode data corresponding to a specific command, and the mode data is generated through encoding the specific command;

wherein the processing circuit is arranged for decoding the output data to generate a decoding result, selecting a specific command from a plurality of different operational commands according to the decoding result, and performing a communication function corresponding to the specific command; and, the plurality of different operational commands include a single write register command, a single read register command, a burst read motion data command, a multi-write register command, a multi-read register command, a status report command, an image read-out command, and a status reset command.

11. The access device of claim 10, wherein the communication circuit is receives a preamble, the mode data, and the content of the command data corresponding to the specific command included in the output data, and the processing circuit decodes the mode data of the output data to generate the decoding result according to mapping relationship between a plurality of commands and mode data stored in a look-up table, where the preamble is utilized for clock recovery.

\* \* \* \* \*